United States Patent
Brunne et al.

(10) Patent No.: US 11,255,506 B2
(45) Date of Patent: Feb. 22, 2022

(54) HEADLIGHT MODULE WITH A LOW-BEAM FUNCTION AND A HIGH-BEAM FUNCTION BASED ON LIGHT EMITTING DIODES

(71) Applicant: Hella GmbH & Co. KGaA, Lippstadt (DE)

(72) Inventors: David Brunne, Dortmund (DE); Dmitry Fedosik, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 224 days.

(21) Appl. No.: 16/300,990

(22) PCT Filed: May 10, 2017

(86) PCT No.: PCT/EP2017/061122
§ 371 (c)(1),
(2) Date: Nov. 13, 2018

(87) PCT Pub. No.: WO2017/198505
PCT Pub. Date: Nov. 23, 2017

(65) Prior Publication Data
US 2020/0318804 A1  Oct. 8, 2020

(30) Foreign Application Priority Data

May 18, 2016  (DE) .................... 10 2016 109 147.2

(51) Int. Cl.
*F21S 41/663*  (2018.01)
*F21S 41/151*  (2018.01)
(Continued)

(52) U.S. Cl.
CPC ........... *F21S 41/663* (2018.01); *F21S 41/143* (2018.01); *F21S 41/151* (2018.01); *F21S 41/24* (2018.01);
(Continued)

(58) Field of Classification Search
CPC ........ F21S 41/24; F21S 41/143; F21S 41/365; F21S 41/151; F21S 45/47; F21S 41/663;
(Continued)

(56) References Cited

U.S. PATENT DOCUMENTS 8,534,892 B2 *  9/2013  Letourneau .......... G02B 6/0008
362/558
9,651,211 B2 *  5/2017  Potter ...................... G02B 6/00
(Continued)

FOREIGN PATENT DOCUMENTS

DE          10065020 A1    3/2002
DE      102009008631 A1    8/2010
(Continued)

OTHER PUBLICATIONS

Machine English Translation (Google Patents) of DE102010046021A1, Michael et al. (Year: 2012).*

(Continued)

*Primary Examiner* — Rajarshi Chakraborty
*Assistant Examiner* — Glenn D Zimmerman
(74) *Attorney, Agent, or Firm* — Husch Blackwell LLP

(57) ABSTRACT

A headlight module with a minimum of one LED for generating a low beam and with a minimum of one LED for generating a high beam. An optical element is provided into which light from the minimum of one LED for generating the high beam can be emitted. The optical element is arranged as a cover for a portion of the light that can be generated by the LED for generating a low beam. The optical element features a decoupling surface that at least partially includes a surface structure with a composition such that, in the area of the surface structure, light is emitted that can be decoupled from the optical element.

10 Claims, 2 Drawing Sheets

(51) Int. Cl.
*F21S 41/143* (2018.01)
*F21S 41/24* (2018.01)
*F21S 41/365* (2018.01)
*F21V 8/00* (2006.01)
*F21S 45/47* (2018.01)
*F21Y 115/10* (2016.01)
*F21W 102/135* (2018.01)
*F21S 41/20* (2018.01)

(52) U.S. Cl.
CPC .......... F21S 41/365 (2018.01); G02B 6/0036 (2013.01); G02B 6/0055 (2013.01); G02B 6/0075 (2013.01); *F21S 41/20* (2018.01); *F21S 45/47* (2018.01); *F21W 2102/135* (2018.01); *F21Y 2115/10* (2016.08)

(58) Field of Classification Search
CPC .. F21S 41/20; F21S 41/43; F21S 41/25; F21S 41/285; G02B 6/0036; G02B 6/0055; G02B 6/0075; F21W 2102/135; F21Y 2115/10
See application file for complete search history.

(56) References Cited

U.S. PATENT DOCUMENTS

| | | | | |
|---|---|---|---|---|
| 9,664,847 | B2* | 5/2017 | Krenn | F21S 41/663 |
| 2008/0013333 | A1* | 1/2008 | Koizumi | B60Q 1/2696 |
| | | | | 362/511 |
| 2009/0129079 | A1* | 5/2009 | Grotsch | G02B 17/08 |
| | | | | 362/235 |
| 2014/0016343 | A1* | 1/2014 | Brendle | F21S 41/365 |
| | | | | 362/518 |
| 2015/0226395 | A1* | 8/2015 | Taudt | F21S 41/153 |
| | | | | 362/511 |
| 2015/0308652 | A1* | 10/2015 | Cabanne | F21S 41/321 |
| | | | | 362/516 |
| 2018/0370419 | A1* | 12/2018 | Danner | F21S 41/65 |

FOREIGN PATENT DOCUMENTS

| | | | |
|---|---|---|---|
| DE | 102010041096 A1 | 3/2012 | |
| DE | 102010046021 A1 * | 3/2012 | ............ F21S 41/43 |
| DE | 102010046021 A1 | 3/2012 | |
| DE | 102013225950 A1 | 6/2015 | |
| DE | 102015215200 A1 | 2/2016 | |
| EP | 1903274 A1 | 3/2008 | |
| WO | 2013/075157 A1 | 5/2013 | |
| WO | 2014/032071 A1 | 3/2014 | |

OTHER PUBLICATIONS

Machine English Translation of DE-102010046021-A1; Hamm Michael Dr (Year: 2012).*

* cited by examiner

HEADLIGHT MODULE WITH A LOW-BEAM FUNCTION AND A HIGH-BEAM FUNCTION BASED ON LIGHT EMITTING DIODES

CROSS REFERENCE

This application claims priority to PCT Application No. PCT/EP2017/061122, filed May 10, 2017, which itself claims priority to German Patent Application 10 2016 109147, filed May 18, 2016, the entirety of both of which are hereby incorporated by reference.

FIELD OF THE INVENTION

The invention involves a headlight module with a minimum of one LED for generating a low beam and with a minimum of one LED for generating a high beam, whereby an optical element is provided into which light from the minimum of one LED for generating the high beam can be emitted, and whereby the optical element is arranged as a cover for a portion of the light that can be generated by the LED for generating a low beam. Furthermore, the invention involves an optical element for this type of headlight module.

BACKGROUND

DE 10 2010 041 096 A1 discloses a headlight module with LEDs for generating a low beam and with LEDs for generating a high beam and an optical element is disclosed in the form of a light guide element into which the light from the LED for generating the high beam can be emitted. The LEDs for the low beam emit light into a reflector and the low beam shines onto a mirrored surface of the optical element such that a front edge of the optical element acts as a bezel edge that creates the cut-off line of a low beam. The advantage lies in the fact that both a low beam function and a high beam function can be fulfilled using a single headlight module based on the use of LEDs and light guide elements. In this design, the high beam function is generated mostly due to the fact that the LEDs for generating the low beam remain switched on and the LEDs for generating the high beam are added. Here, the LEDs for the high beam add the portion of the overall light field of the high beam that was dimmed to create the low beam. However, there is a disadvantage here in that the bezel edge still causes a cut-off line to develop that is visible to an observer, even in the case of the high beam function, and this cut-off line is to be avoided when fulfilling a high beam function.

SUMMARY OF THE INVENTION

The purpose of the invention is to make an improvement to an LED-based headlight module and to provide a corresponding optical element that can be used to fulfill a high beam function without a visible cut-off line in the distant field in front of the vehicle. In this design, it is to be possible to use the headlight module as a standard module for both light functions based on the arrangement of LEDs, e.g. in a vehicle headlamp. A special requirement here is that the headlight module is to feature a joint decoupling lens for the low beam and the high beam. Specifically, this is to be a lens that both the low beam and the high beam are guided through.

The invention includes the technical contribution whereby the optical element features a decoupling surface that at least partially includes a surface structure with a composition such that, in the area of the surface structure, light is emitted that can be decoupled from the optical element.

The central concept of the invention in this design is an optical "blurring" of the high beam and the low beam together. The design uses intentional scattering to ensure that the cut-off line is no longer visible when operating either the LEDs for the low beam or the LEDs for the high beam. In this design, the high beam is specifically scattered into the adjacent low beam range, smoothing out the sudden shift in intensity above and below the cut-off line. This design does not change the effect of the bezel edge created by the optical element for the low beam and does not change the option to depict the bezel edge in the distant field in front of the vehicle.

For example, the surface structuring is formed by adding roughness to the decoupling surface. Here, the roughness forms a surface topography that is not geometrically defined. However, it is also possible, for example, that the surface structure has a geometrically defined structure, at least in a certain area, created by a micro-embossing procedure or the like.

As an additional advantage, the optical element features multiple light guides, whereby the respective LEDs for high beam coupling are positioned at the open ends of the light guides and whereby the light guides are designed to be adjacent to each other and positioned across from the surface structure. If the LEDs at the open ends of the light guides are operated, then the light shines onto the area of the surface structure. Decoupling takes place over this area, which fundamentally results in the high beam being scattered. The light guides are positioned next to each other in the crosswise direction. The optical element and the light guides can be designed as a single injection-molded plastic part. Alternatively, it can also be designed as a glass element that specifically stands out due to the fact that its optical properties do not change considerably even in the event of significant temperature changes. The area with surface structuring in this design also extends straight across the area over which the light guides across from the optical element are positioned. Here, the light guides and the optical element in particular form a single element.

As an additional advantage, the optical element features a mirrored surface, whereby the optical element is positioned relative to the low beam that can be generated in such a way that the low beam can be reflected on the mirrored surface. The mirrored surface in this design is located on a surface on the top side of the optical element, whereby the top surface and the coupling surface together form the bezel edge. As an alternative, the mirrored surface can also be created using an attached film, a separate mirror element or the like.

In accordance with an additional embodiment of the optical element, it is ensured that the mirrored surface ends with a spacing in front of the bezel edge and that this causes a top-side coupling area to be opened up, into which a portion of the low beam can be coupled and decoupled by the decoupling surface. The low beam is partially coupled into the optical element and the low beam is decoupled using the area with surface structuring in order to achieve additional optical "blurring" of the cut-off line, whereby the edge sharpness is only slightly reduced in such a way that, during operation of the low beam without the high beam, no scattered light can reach the high beam area and, for example, blind oncoming traffic.

Furthermore, a cooling and support element is provided on which the LED for generating the low beam and the LED for generating the high beam are positioned. The cooling and support element can be used to cool the multiple LEDs. In addition, the cooling and support element forms a basic element of the headlight module.

As an added advantage, the bezel edge has a contour to form a cut-off line for the low beam that has the legally required contour profile in the crosswise direction in front of a vehicle. In other words, the contour of the bezel edge is formed in the distant field using the lens.

In accordance with an additional embodiment of the low beam and the high beam, a lens is positioned in front of the optical element with respect to the direction of propagation of the low beam. The low beam and the high beam can be emitted into this lens together. The inventive headlight module is also used to create, in the broader sense, a bi-LED matrix module. This matrix module combines the low beam function and the high beam function. The multiple LEDs for the low beam and/or the high beam can be designed to be switched on and off individually in order to adjust the light field separately for low beam and high beam usage.

The invention also involves an optical element for a headlight module featuring multiple light guides for light coupling into the optical element using the respective ends of the light guides, whereby the light guides are positioned adjacent to each other and across from a decoupling surface and whereby the decoupling surface has a surface structuring. The additional features and advantages prominently described in connection with the headlight module apply in equal measure to the inventive optical element.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
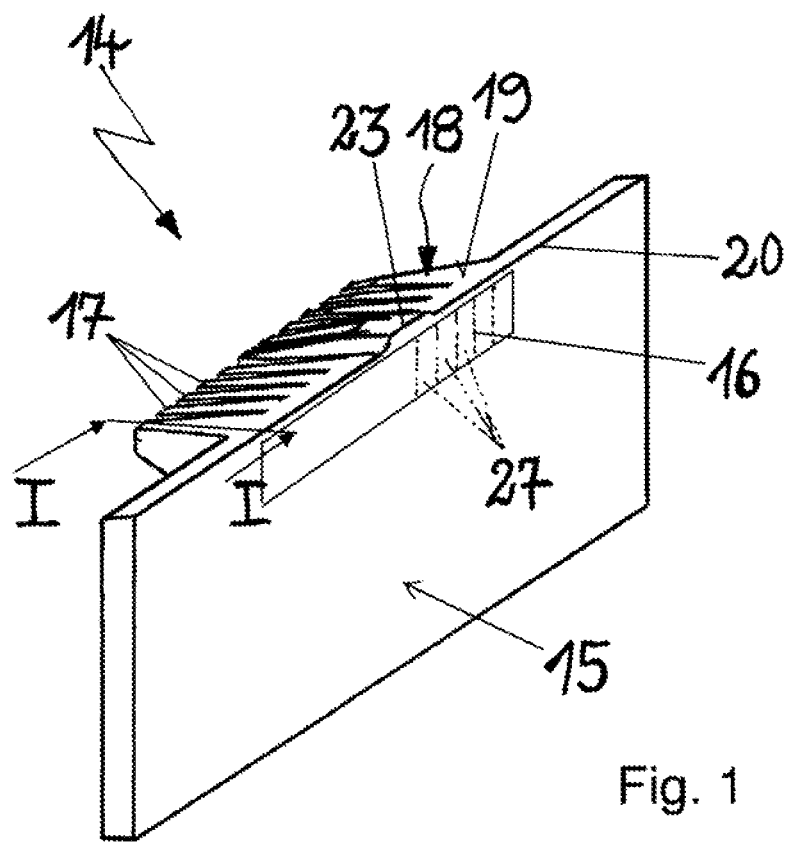
FIG. 1 is a perspective view of an optical element.

FIG. 1 shows a perspective view of an optical element (14), whereby the view shows a decoupling surface (15) on the front side. On the side opposite from the decoupling surface (15), the optical element (14) has multiple light guides (17). At the open end surfaces of the light guides, LEDs for generating the high beam can be positioned such that the number of LEDs may correspond to the number of light guides (17). The LEDs assigned to the individual light guides (17) can, for example, be switched on and off individually, fulfilling a matrix function. A decoupling surface (15) has a section with surface structuring (16). The surface structuring (16) can be designed to extend in the crosswise direction over the entire area of the multiple light guides (17). As an alternative, the surface structuring (16) can be divided into sections (27). Here, each section (27) can be assigned to a light guide (17).

Figure 2:
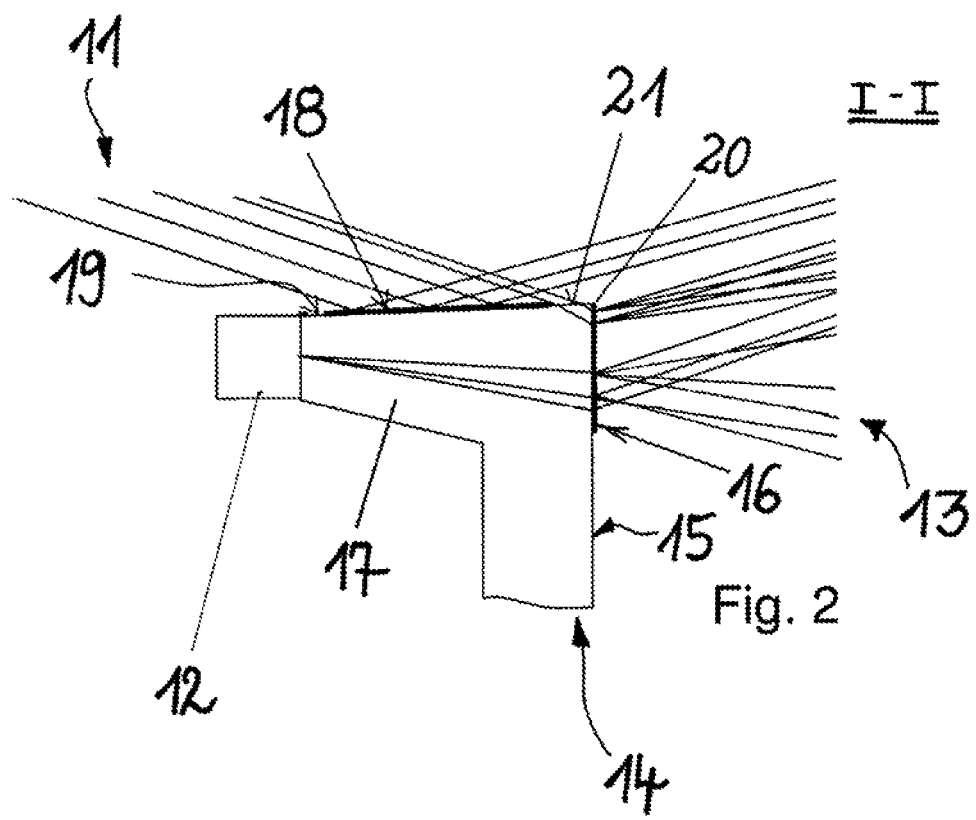
FIG. 2 is a transverse section view of the optical element with an LED for generating a high beam.

On a top surface (19), the optical element (14) has a mirrored surface (18). The top surface (19) is equipped with a special contour (23) that serves as a contour for a cut-off line. Low beam light hitting near the rear of the mirrored surface (18) can form a cut-off line with the front-side bezel edge (20) so that the contour (23) of the bezel edge (20) can appear in the distant field in front of the vehicle. FIG. 2 shows a cross section through the optical element (14) along the I-I cut line.

FIG. 2 shows the I-I cross section view in accordance with FIG. 1 and the optical element (14) with a light guide (17) is shown. At the open end of the light guide (17), there is an LED (12) for coupling the high beam (13) into the light guide (17) and thus into the optical element (14).

On the coupling surface (15) positioned across from the light guide (17), there is a surface structure (16). The surface structure (16) causes the high beam (13) to be scattered in such a way that it is also is directed into the area of the low beam (11).

The top surface (19) has a mirrored surface (18) that does not reach the front bezel edge (20) of the optical element (14). This creates a coupling area (21) on the top side, into which a portion of the low beam (11) can be coupled, and this portion can be decoupled again by the decoupling surface (15) with the surface structuring (16). This also causes a partial scattering of the low beam (11), which creates additional "blurring" of the cut-off line between the low beam (11) and the high beam (13).

Figure 3:
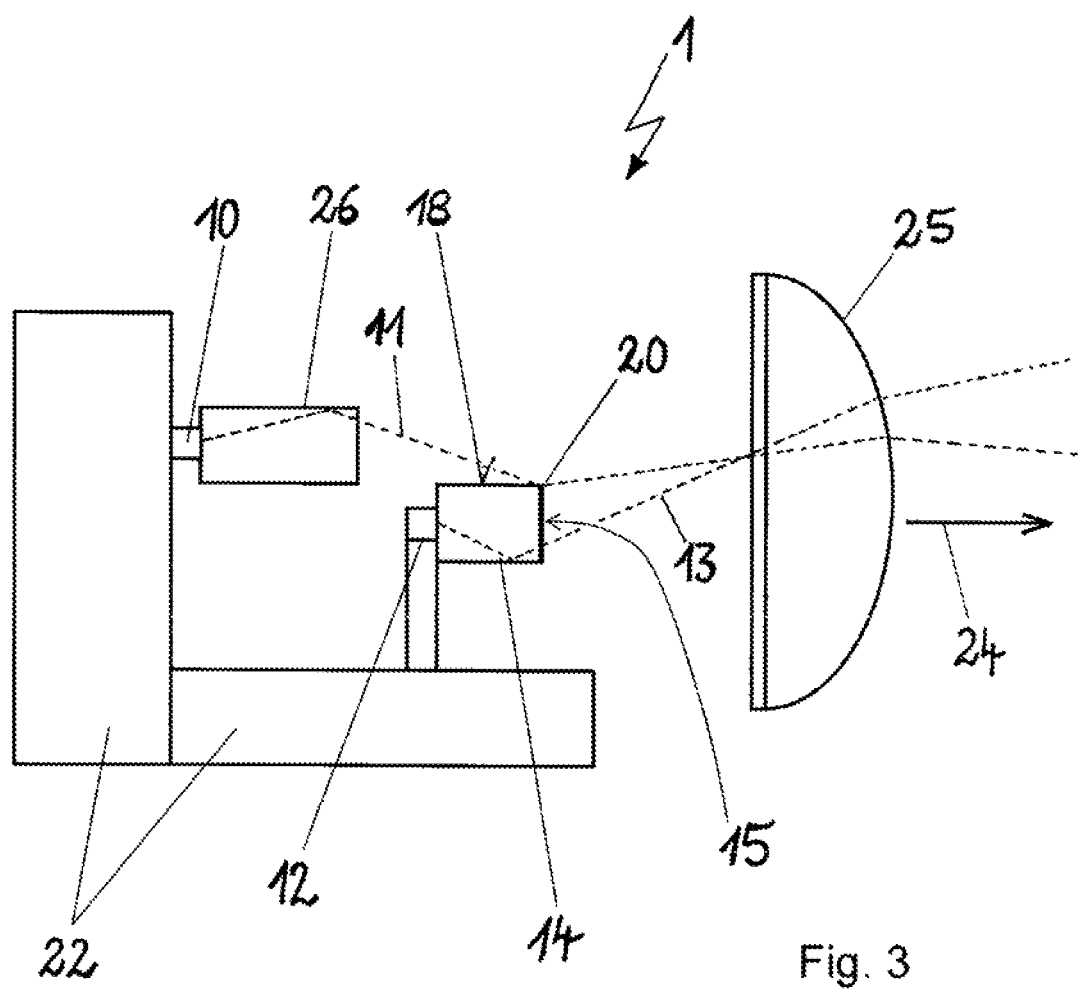
FIG. 3 is a schematic view of the headlight module with the inventive optical element.

FIG. 3 shows a schematic view of a headlight module (1) with an abstracted illustration of an optical element (14). The main body of the headlight module (1) is a cooling and support element (22). The LEDs (10) for the low beam and the LEDs (12) for the high beam are held by the cooling and support element (22). There is a light guide element (26) positioned in front of the LEDs (10) for the low beam (11) and the optical element (14) is positioned in front of the LEDs (12) for the high beam (13). This design allows the light from the LEDs (10) to be coupled into the light guide element (26) and the light from the LEDs (12) for the high beam (13) to be coupled into the optical element (14). The optical element (14) has the roughened decoupling surface (15) positioned across from the arrangement of LEDs (12) for the high beam (13). Relative to the direction of propagation (24) of the low beam (11) or the high beam (13), optical element (14) is spatially positioned in front of the LED (10) with the light guide element (26). At a minimum, however, the optical element (14) extends into an area spatially positioned in front of the LED (10) with the light guide element (26) with respect to the direction of propagation (24) of the low beam (11).

The low beam (11) and the high beam (13) are coupled together into a lens (25) that is spatially located in front of the optical element (14) based on the direction of propagation (24) of the light. In this design, the light guide element (26) for the low beam is located behind the optical element (14) in a position arranged above the optical element (14). This way, a portion of the low beam (11) can reach the mirrored surface (18) of the optical element (14) and a cut-off line can be created by the bezel edge (20) on the optical element (14).

If a low beam is required, then only the LEDs (10) for the low beam (11) are activated. If a high beam is required, then the LEDs (10) for the low beam (11) remain activated and the LEDs (12) for the high beam (13) are added. For each of the low beam (11) and/or the high beam (13), multiple LEDs (10, 12) may be provided that are set up to be activated individually to fulfill a matrix function.

The optical element (14), the illustration of which is merely a rough diagram, may feature an embodiment as depicted in FIGS. 1 and 2. The surface structuring (16) of the decoupling surface (15) and the top-side coupling area (21) for the low beam (11) result in a "blurring" of the cut-off line when the high beam (13) is operated, presenting a simple solution to the problem being addressed by this invention.

In its embodiment, the invention does not relate solely to the preferred design example described above. On the contrary, a number of variants that use the solution as represented above are conceivable, even on designs that are fundamentally different. All characteristics resulting from the claims, the description or the drawings and/or advantages, including design details or spatial arrangements may be essential to the invention, both in their own right and in the wide variety of combinations.

LIST OF REFERENCE SYMBOLS

1 Headlamp module
10 LED for low beam
11 Low beam
12 LED for high beam
13 High beam
14 Optical element
15 Decoupling surface
16 Surface structuring
17 Light guide
18 Mirrored surface
19 Top surface
20 Bezel edge
21 Top-side coupling area
22 Cooling and support element
23 Contour for a cut-off line
24 Direction of propagation
25 Lens
26 Light guide element
27 Section

The invention claimed is:

1. A headlight module comprising:
   at least one first LED, wherein a first light from the at least one first LED generates in part a low beam;
   at least one second LED positioned in an area spatially in front of the at least one first LED with respect to a direction of propagation of the low beam, wherein a second light from the at least one second LED generates in part a high beam;
   an optical element that receives the second light and generates in part the high beam therefrom;
   wherein the optical element is set up as a cover for a part of the first light,
   wherein the optical element comprises:
      at least one first light guide coupled to the at least one second LED and entirely positioned and entirely located on a first side of the optical element;
      surface structuring formed on a second side of the optical element, wherein the second side is opposite the first side;
      a decoupling surface that at least partially surrounds the surface structuring on the second side of the optical element, the decoupling surface including a bump along its top edge defined by a special contour that serves as a contour for a cut-off line;
      wherein within the area of the surface structuring, decoupled light is emitted out of the optical element; and
      wherein the surface structuring further includes at least one section corresponding to the at least one first light guide.

2. The headlight module according to claim 1, wherein the surface structuring is formed by a roughening of the decoupling surface.

3. The headlight module according to claim 1, wherein the at least one second LED includes a plurality of LEDs and the at least one light guide includes a plurality of light guides, wherein each of the plurality of LEDs are arranged at respective free ends of corresponding ones of the plurality of light guides constructed adjacent to each other.

4. The headlight module of claim 1, wherein the optical element has a mirrored surface, and wherein the optical element is arranged in such a way relative to the low beam that the low beam is at least partially reflected on the mirrored surface.

5. The headlight module of claim 1, further comprising a cooling and support element on which the at least one first LED and the at least one second LED are arranged.

6. The headlight module of claim 1, further comprising a lens positioned in relation to a direction of propagation of the low beam and of the high beam in front of the optical element and the low beam and high beam can be emitted into this lens together.

7. The headlight module of claim 1 further comprising:
   at least one second light guide coupled to the at least one first LED.

8. The headlight module of claim 4, wherein the mirrored surface appears on a top surface of the optical element, whereby the top surface and the decoupling surface form a bezel edge where the top surface and the decoupling surface meet, and wherein the bezel edge is a top edge of the decoupling surface.

9. The headlight module of claim 8, wherein the mirrored surface continuously extends from a rear edge of the top surface proximate to the first side to a location partially along the top surface and set back from the bezel edge so as to produce a non-mirrored and at least partially transparent coupling area on the top surface between the location partially along the top surface and the bezel edge, wherein the coupling area enables a part of the low beam to pass through the top surface and become decoupled by the decoupling surface.

10. A headlight module comprising:
   at least one first LED, wherein a first light from the at least one first LED generates in part a low beam;
   at least one second LED, wherein a second light from the at least one second LED generates in part a high beam;
   an optical element that receives the second light and generates in part the high beam therefrom;
   wherein the optical element comprises:
      at least one first light guide coupled to the at least one second LED and entirely positioned and entirely located on a first side of the optical element;
      surface structuring formed on a second side of the optical element, wherein the second side is opposite the first side;
      a decoupling surface that at least partially surrounds the surface structuring on the second side of the optical element, the decoupling surface including a bump along its top edge defined by a special contour that serves as a contour for a cut-off line;
      a mirrored surface on a top surface of the optical element that forms a bezel edge where the top surface and the decoupling surface meet;
      wherein the bezel edge is a top edge of the decoupling surface;
      wherein the mirrored surface continuously extends from a rear edge of the top surface proximate to the first side to a location partially along the top surface and set back from the bezel edge so as to produce a non-mirrored and at least partially transparent coupling area on the top surface between the location partially along the top surface and the bezel edge;

wherein the coupling area enables a part of the low beam to pass through the top surface and become decoupled by the decoupling surface;

wherein within the area of the surface structuring, decoupled light that includes the high beam and the part of the low beam that passes through the top surface is emitted out of the optical element; and wherein the surface structuring further includes at least one section corresponding to the at least one first light guide.

* * * * *